US012809030B2

(12) United States Patent
Ferrara et al.

(10) Patent No.: US 12,809,030 B2
(45) Date of Patent: Nov. 24, 2026

(54) LIGHT DETECTION AND RANGING (LIDAR) MODULE FOR A LIDAR SYSTEM

(71) Applicant: Aurora Operations, Inc., Mountain View, CA (US)

(72) Inventors: James Ferrara, Oakland, CA (US); Amir Hosseini, San Jose, CA (US); Sen Lin, Mountain View, CA (US); Zhizhong Tang, Palo Alto, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 821 days.

(21) Appl. No.: 18/191,621

(22) Filed: Mar. 28, 2023

(65) Prior Publication Data

US 2024/0393466 A1 Nov. 28, 2024

(51) Int. Cl.

*G01S 17/931* (2020.01)
*B60W 60/00* (2020.01)
*G01S 7/481* (2006.01)

(52) U.S. Cl.

CPC .......... *G01S 17/931* (2020.01); *G01S 7/4813* (2013.01); *G01S 7/4814* (2013.01); *G01S 7/4817* (2013.01); *B60W 60/00* (2020.02); *B60W 2420/408* (2024.01)

(58) Field of Classification Search

CPC ................ G01S 7/4814; G01S 7/4817; B60W 2420/408; H01S 5/0071; H01S 5/02208; H01S 5/02255; H01S 5/5027

See application file for complete search history.

(56) References Cited

U.S. PATENT DOCUMENTS

| | | | | |
|---|---|---|---|---|
| 7,184,386 B2 * | 2/2007 | Nikolai | G11B 7/124 | 369/112.09 |
| 7,734,189 B2 * | 6/2010 | Ranganath | H04B 10/5053 | 359/254 |
| 11,378,664 B1 | 7/2022 | Tang et al. | | |
| 2011/0052114 A1 * | 3/2011 | Bernasconi | H01S 5/026 | 438/31 |

(Continued)

FOREIGN PATENT DOCUMENTS

| | | | |
|---|---|---|---|
| JP | H 08247714 A | 9/1996 | |
| WO | WO-2021146116 A1 * | 7/2021 | H01S 5/026 |

OTHER PUBLICATIONS

International Search Report and Written Opinion for Application No. PCT/US2023/086403, mailed May 1, 2024, 10 pages.

*Primary Examiner* — Yuqing Xiao
*Assistant Examiner* — Jempson Noel
(74) *Attorney, Agent, or Firm* — Dority & Manning, P.A.

(57) ABSTRACT

A LIDAR system includes a substrate and an emitter coupled to the substrate and configured to emit a light beam along a first axis of the substrate. The LIDAR system includes an optic device coupled to the substrate and configured to split the light beam into a plurality of light beams. The LIDAR system includes an optical amplifier array coupled to the substrate and configured to amplify the plurality of light beams received from the optic device to generate a plurality of amplified light beams. The LIDAR system includes a transceiver coupled to the substrate and configured to redirect the plurality of amplified light beams from traveling along the first axis of the substrate to traveling along a second axis of the substrate that is different from the first axis.

20 Claims, 9 Drawing Sheets

(56) References Cited

U.S. PATENT DOCUMENTS

| | | | | |
|---|---|---|---|---|
| 2014/0376001 | A1* | 12/2014 | Swanson | G01S 7/4817 356/479 |
| 2015/0358083 | A1* | 12/2015 | Doerr | H04B 10/40 398/139 |
| 2016/0223663 | A1* | 8/2016 | Schmalenberg | G01S 17/931 |
| 2019/0004394 | A1 | 1/2019 | Shin et al. | |
| 2019/0265574 | A1* | 8/2019 | Skirlo | G02F 1/3136 |
| 2020/0049886 | A1 | 2/2020 | Chriqui et al. | |
| 2021/0103199 | A1 | 4/2021 | Wu et al. | |
| 2021/0173083 | A1 | 6/2021 | Shin et al. | |
| 2022/0320832 | A1 | 10/2022 | Koch et al. | |
| 2022/0404474 | A1* | 12/2022 | Rabadam | G02B 6/4239 |

* cited by examiner

LIGHT DETECTION AND RANGING (LIDAR) MODULE FOR A LIDAR SYSTEM

BACKGROUND

Light Detection and Ranging (LIDAR) systems use lasers to create three-dimensional representations of surrounding environments. A LIDAR system includes at least one emitter paired with a receiver to form a channel, though an array of channels may be used to expand the field of view of the LIDAR system. During operation, each channel emits a laser beam into the environment. The laser beam reflects off of an object within the surrounding environment, and the reflected laser beam is detected by the receiver. A single channel provides a single point of ranging information. Collectively, channels are combined to create a point cloud that corresponds to a three-dimensional representation of the surrounding environment.

SUMMARY

Aspects and advantages of implementations of the present disclosure will be set forth in part in the following description, or may be learned from the description, or may be learned through practice of the implementations.

Example aspects of the present disclosure are directed to LIDAR systems. As further described herein, the LIDAR systems can be used by various devices and platforms (e.g., robotic platforms, etc.) to improve the ability of the devices and platforms to perceive their environment and perform functions in response thereto (e.g., autonomously navigating through the environment).

The present disclosure is directed to LIDAR systems for use with, for example, vehicles. A LIDAR system according to example aspects of the present disclosure includes a LIDAR module that includes an emitter configured to emit a light beam. The LIDAR module includes an optic device configured to split the light beam into a plurality of light beams. The LIDAR module includes an optical amplifier array configured to amplify the plurality of light beams to generate a plurality of amplified light beams. For instance, the optical power of the amplified light beams can, in some implementations, range from 10 decibels greater than an optical power of the plurality of light beams to 30 decibels greater than the optical power of the plurality of light beams. The LIDAR module includes a transceiver configured to facilitate transmitting the plurality of amplified light beams into a surrounding environment. The transceiver is further configured to receive return light beams from the surrounding environment that can be combined to generate point cloud data representative of objects in the surrounding environment.

The emitter, optic device, optical amplifier array, and transceiver are disposed on a substrate of the LIDAR module. For instance, the emitter, optic device, optical amplifier array, and transceiver can all be disposed on a first surface of the substrate. In some implementations, the transceiver is aligned with an aperture defined by a particular portion of the substrate. The transceiver is further configured to redirect the plurality of amplified light beams into the aperture. For instance, the transceiver is configured to redirect the plurality of amplified light beams traveling along a first axis (e.g., longitudinal axis) of the substrate to traveling along a second axis (e.g., vertical axis) of the substrate.

In some implementations, the optical amplifier array can be edge-coupled to the optic device. For instance, a plurality of inputs of the optical amplifier array can be coupled to respective outputs of the optic device. In this manner, the plurality of light beams can be provided to the optical amplifier array without requiring an optic (e.g., micro lens) to direct the plurality of light beams to respective inputs of the optical amplifier array. Furthermore, in some implementations, the transceiver can be edge-coupled to the optical amplifier array. For instance, a plurality of inputs of the transceiver can be coupled to respective outputs of the optical amplifier array. In this manner, the plurality of amplified light beams can be provided to the transceiver without requiring a dedicated optic (e.g., micro lens) to direct the plurality of amplified light beams to respective inputs of the transceiver.

In some implementations, the LIDAR system can include a heat spreader coupled to the substrate to enclose the emitter, optic device, optical amplifier array, and transceiver in a cavity defined by the heat spreader. Furthermore, the heat spreader can be coupled to the optical amplifier array to facilitate heat transfer from the optical amplifier array to the heat spreader. In this manner, heat generated by the optical amplifier array due to, for instance, amplification of the plurality of light beams received from the optic device can be more efficiently dissipated.

In some implementations, the LIDAR system can include an optical window (e.g., a sapphire window) disposed on a second surface of the substrate. More specifically, the optical window can be aligned with the aperture defined by a particular portion of the substrate. In this manner, the plurality of amplified light beams that the transceiver directs into the aperture at the first surface of the substrate can exit the aperture at the second surface of the substrate and pass through the optical window. In alternative implementations, the transceiver can be coupled to the first surface of the substrate with an epoxy material, metallic solder, or a brazing material to create a seal (e.g., full hermetic or near hermetic) between the transceiver and the substrate. More specifically, the transceiver can, in some implementations, be coupled to the first surface of the substrate with the epoxy material to create a near hermetic seal. In alternative implementations, the transceiver can be coupled to the first surface of the substrate with the metallic solder or the brazing material to create a hermetic seal. It will be appreciated that the seal between the substrate and the transceiver can eliminate the need for the optical window coupled to the second surface of the substrate.

A LIDAR system according to the present disclosure can provide numerous technical effects and benefits. For instance, the edge-coupling between the optical amplifier array and the optic device and between the optical amplifier array and the transceiver can eliminate the need for dedicated optics (e.g., micro lenses), which can reduce the complexity of the LIDAR module. Furthermore, since the edge-coupling requires the components (e.g., optic device, optical amplifier array, transceiver) to be placed closer to one another on the substrate, the size of the substrate can be reduced, which can reduce the overall footprint of the LIDAR module.

In one example aspect of the present disclosure, a LIDAR system is provided. The LIDAR system includes a substrate and an emitter coupled to the substrate. The emitter is configured to emit a light beam along a first axis of the substrate. The LIDAR system includes an optic device coupled to the substrate. The optic device is configured to split the light beam into a plurality of light beams. The LIDAR system includes an optical amplifier array coupled to the substrate. The optical amplifier array is configured to amplify the plurality of light beams received from the optic device to generate a plurality of amplified light beams. The LIDAR system includes a transceiver coupled to the substrate. The transceiver is configured to redirect the plurality of amplified light beams from traveling along the first axis of the substrate to a second axis of the substrate that is different from the first axis.

In some implementations, the transceiver includes an edge grating coupler configured to redirect the plurality of amplified light beams from traveling along the first axis of the substrate to traveling along the second axis of the substrate.

In some implementations, a particular portion of the substrate defines an aperture. In such implementations, the transceiver is configured to redirect the plurality of amplified light beams from traveling along the first axis of the substrate to traveling along the second axis of the substrate to direct the plurality of amplified light beams through the aperture defined by the substrate.

In some implementations, the LIDAR system includes a heat spreader coupled to the substrate to enclose the emitter, the optic device, the optical amplifier array, and the transceiver within a cavity defined by the heat spreader.

In some implementations, a particular portion of the heat spreader defines an aperture and the transceiver is aligned with the aperture. In this manner, the transceiver can redirect the plurality of amplified light beams from traveling along the first axis of the substrate to traveling along the second axis of the substrate to direct the plurality of amplified light beams through the aperture defined by the particular portion of the heat spreader.

In some implementations, the heat spreader is coupled to the optical amplifier array to facilitate heat transfer from the optical amplifier array to the heat spreader.

In some implementations, the optical amplifier array is edge-coupled to the optic device and the transceiver is edge-coupled to the optical amplifier array.

In some implementations, the emitter, the optic device, the optical amplifier array, and the transceiver are coupled to a first surface of the substrate. In addition, a particular portion of the substrate defines an aperture extending therethrough and the transceiver is aligned with the aperture. In some implementations, the LIDAR system additionally includes an optical window coupled to a second surface of the substrate and aligned with the aperture. In such implementations, the transceiver can be coupled to the substrate with an epoxy material to create a seal (e.g., near hermetic) between the substrate and the transceiver.

In some implementations, the emitter includes a distributed feedback laser and the light beam includes a laser beam.

In some implementations, the substrate includes a ceramic substrate. In alternative implementations, the substrate can include an organic substrate.

In some implementations, the LIDAR system includes an optic configured to receive the plurality of amplified light beams traveling along the second axis of the substrate and collimate the plurality of amplified light beams to generate a plurality of collimated light beams. In addition, the LIDAR system includes a LIDAR scanner configured to transmit the plurality of collimated light beams into a surrounding environment and receive a plurality of return light beams from the surrounding environment.

In some implementations, the LIDAR system includes a first optic positioned between the optic device and the optical amplifier array along the first axis of the substrate. In addition, the LIDAR system includes a second optic positioned between the optical amplifier array and the transceiver along the first axis of the substrate. Furthermore, in some implementations, at least one of the first optic or the second optic can include a lens array having one or more collimating lenses and one or more focusing lenses.

In another example aspect of the present disclosure, an autonomous vehicle control system is provided. The autonomous vehicle control system includes a LIDAR system. The LIDAR system includes a substrate and an emitter coupled to the substrate. The emitter is configured to emit a light beam along a first axis of the substrate. The LIDAR system includes an optic device coupled to the substrate. The optic device is configured to split the light beam into a plurality of light beams. The LIDAR system includes an optical amplifier array coupled to the substrate. The optical amplifier array is configured to amplify the plurality of light beams received from the optic device to generate a plurality of amplified light beams. The LIDAR system includes a transceiver coupled to the substrate. The transceiver is configured to redirect the plurality of amplified light beams from traveling along the first axis of the substrate to a second axis of the substrate that is different from the first axis.

In another example aspect of the present disclosure, an autonomous vehicle is provided. The autonomous vehicle includes a LIDAR system. The LIDAR system includes a substrate and an emitter coupled to the substrate. The emitter is configured to emit a light beam along a first axis of the substrate. The LIDAR system includes an optic device coupled to the substrate. The optic device is configured to split the light beam into a plurality of light beams. The LIDAR system includes an optical amplifier array coupled to the substrate. The optical amplifier array is configured to amplify the plurality of light beams received from the optic device to generate a plurality of amplified light beams. The LIDAR system includes a transceiver coupled to the substrate. The transceiver is configured to redirect the plurality of amplified light beams from traveling along the first axis of the substrate to a second axis of the substrate that is different from the first axis.

Other example aspects of the present disclosure are directed to other systems, methods, vehicles, apparatuses, tangible non-transitory computer-readable media, and devices for motion prediction and/or operation of a device including a LIDAR system having a LIDAR module according to example aspects of the present disclosure.

These and other features, aspects and advantages of various implementations of the present disclosure will become better understood with reference to the following description and appended claims. The accompanying drawings, which are incorporated in and constitute a part of this specification, illustrate implementations of the present disclosure and, together with the description, serve to explain the related principles.

DETAILED DESCRIPTION

The following describes the technology of this disclosure within the context of an autonomous vehicle for example purposes only. As described herein, the technology is not limited to an autonomous vehicle and can be implemented within other robotic and computing systems as well as various devices. For example, the systems and methods disclosed herein can be implemented in a variety of ways including, but not limited to, a computer-implemented method, an autonomous vehicle system, an autonomous vehicle control system, a robotic platform system, a general robotic device control system, a computing device, etc.

Figure 1:
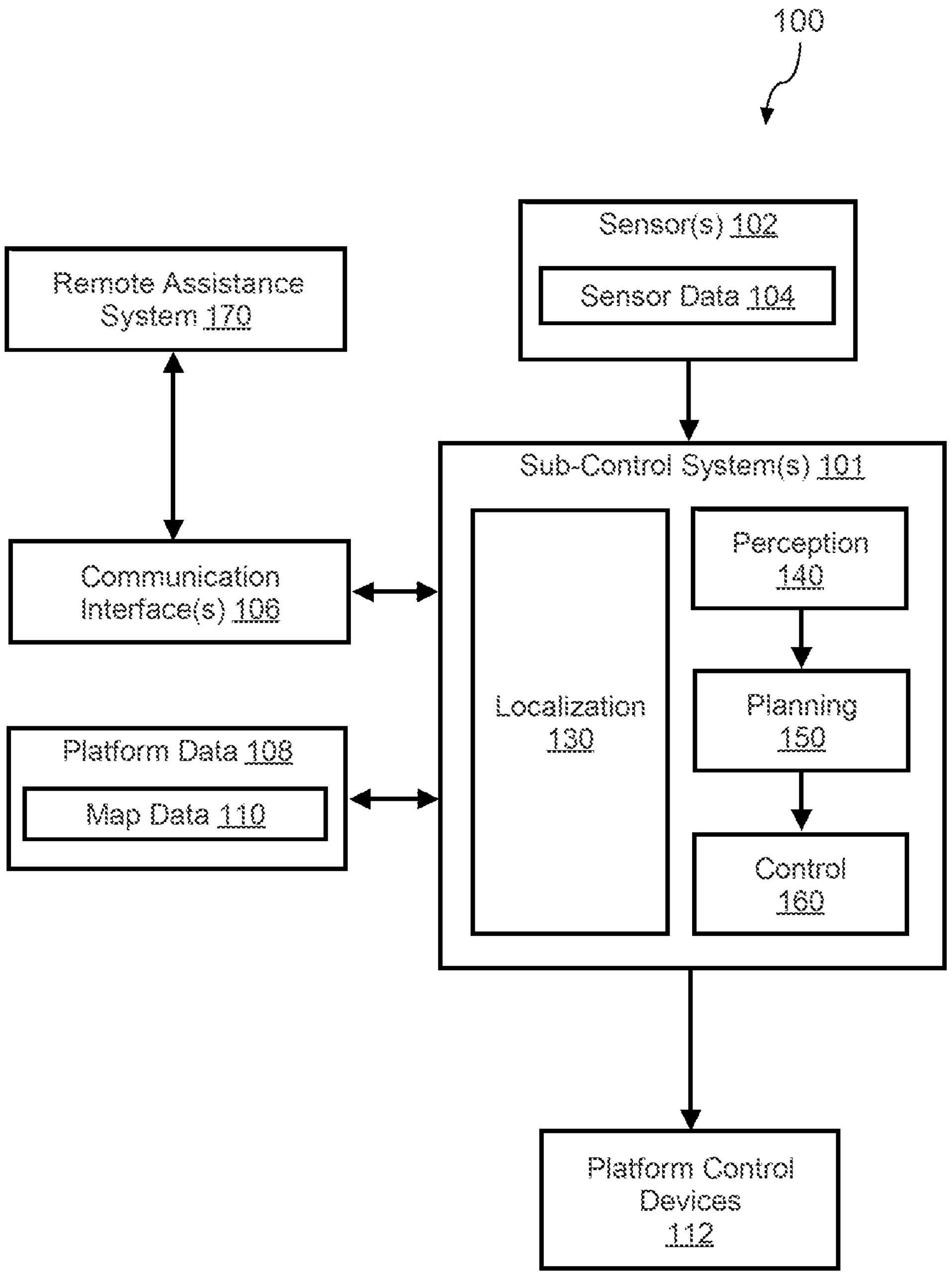
FIG. 1 depicts a block diagram of an example system according to some implementations of the present disclosure.

With reference to FIGS. 1-9, example implementations of the present disclosure are discussed in further detail. FIG. 1 depicts a block diagram of an example autonomous vehicle control system 100 for an autonomous vehicle according to some implementations of the present disclosure. The autonomous vehicle control system 100 can be implemented by a computing system of an autonomous vehicle). The autonomous vehicle control system 100 can include one or more sub-control systems 101 that operate to obtain inputs from sensor(s) 102 or other input devices of the autonomous vehicle control system 100. In some implementations, the sub-control system(s) 101 can additionally obtain platform data 108 (e.g., map data 110) from local or remote storage. The sub-control system(s) 101 can generate control outputs for controlling the autonomous vehicle (e.g., through platform control devices 112, etc.) based on sensor data 104, map data 110, or other data. The sub-control system 101 may include different subsystems for performing various autonomy operations. The subsystems may include a localization system 130, a perception system 140, a planning system 150, and a control system 160. The localization system 130 can determine the location of the autonomous vehicle within its environment; the perception system 140 can detect, classify, and track objects and actors in the environment; the planning system 150 can determine a trajectory for the autonomous vehicle; and the control system 160 can translate the trajectory into vehicle controls for controlling the autonomous vehicle. The sub-control system(s) 101 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the sub-control system(s) 101 can be shared among its subsystems, or a subsystem can have a set of dedicated computing resources.

In some implementations, the autonomous vehicle control system 100 can be implemented for or by an autonomous vehicle (e.g., a ground-based autonomous vehicle). The autonomous vehicle control system 100 can perform various processing techniques on inputs (e.g., the sensor data 104, the map data 110) to perceive and understand the vehicle's surrounding environment and generate an appropriate set of control outputs to implement a vehicle motion plan (e.g., including one or more trajectories) for traversing the vehicle's surrounding environment. In some implementations, an autonomous vehicle implementing the autonomous vehicle control system 100 can drive, navigate, operate, etc. with minimal or no interaction from a human operator (e.g., driver, pilot, etc.).

In some implementations, the autonomous vehicle can be configured to operate in a plurality of operating modes. For instance, the autonomous vehicle can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous vehicle can operate in a semi-autonomous operating mode in which the autonomous vehicle can operate with some input from a human operator present in the autonomous vehicle (or a human operator that is remote from the autonomous platform). In some implementations, the autonomous vehicle can enter into a manual operating mode in which the autonomous vehicle is fully controllable by a human operator (e.g., human driver, etc.) and can be prohibited or disabled (e.g., temporary, permanently, etc.) from performing autonomous navigation (e.g., autonomous driving, etc.). The autonomous vehicle can be configured to operate in other modes such as, for example, park or sleep modes (e.g., for use between tasks such as waiting to provide a trip/service, recharging, etc.). In some implementations, the autonomous vehicle can implement vehicle operating assistance technology (e.g., collision mitigation system, power assist steering, etc.), for example, to help assist the human operator of the autonomous platform (e.g., while in a manual mode, etc.).

The autonomous vehicle control system 100 can be located onboard (e.g., on or within) an autonomous vehicle and can be configured to operate the autonomous vehicle in various environments. The environment may be a real-world environment or a simulated environment. In some implementations, one or more simulation computing devices can simulate one or more of: the sensors 102, the sensor data 104, communication interface(s) 106, the platform data 108, or the platform control devices 112 for simulating operation of the autonomous vehicle control system 100.

In some implementations, the sub-control system(s) 101 can communicate with one or more networks or other systems with communication interface(s) 106. The communication interface(s) 106 can include any suitable components for interfacing with one or more network(s), including, for example, transmitters, receivers, ports, controllers, antennas, or other suitable components that can help facilitate communication. In some implementations, the communication interface(s) 106 can include a plurality of components (e.g., antennas, transmitters, or receivers, etc.) that allow it to implement and utilize various communication techniques (e.g., multiple-input, multiple-output (MIMO) technology, etc.).

In some implementations, the sub-control system(s) 101 can use the communication interface(s) 106 to communicate with one or more computing devices that are remote from the autonomous vehicle over one or more network(s). For instance, in some examples, one or more inputs, data, or functionalities of the sub-control system(s) 101 can be supplemented or substituted by a remote system communicating over the communication interface(s) 106. For instance, in some implementations, the map data 110 can be downloaded over a network to a remote system using the communication interface(s) 106. In some examples, one or more of the localization system 130, the perception system 140, the planning system 150, or the control system 160 can be updated, influenced, nudged, communicated with, etc. by a remote system for assistance, maintenance, situational response override, management, etc.

The sensor(s) 102 can be located onboard the autonomous platform. In some implementations, the sensor(s) 102 can include one or more types of sensor(s). For instance, one or more sensors can include image capturing device(s) (e.g., visible spectrum cameras, infrared cameras, etc.). Additionally or alternatively, the sensor(s) 102 can include one or more depth capturing device(s). For example, the sensor(s) 102 can include one or more LIDAR sensor(s) or Radio Detection and Ranging (RADAR) sensor(s). The sensor(s) 102 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 102 for capturing depth information can be fixed to a rotational device in order to rotate the sensor(s) 102 about an axis. The sensor(s) 102 can be rotated about the axis while capturing data in interval sector packets descriptive of different portions of a three-hundred-and-sixty-degree view of a surrounding environment of the autonomous platform. In some implementations, one or more of the sensor(s) 102 for capturing depth information can be solid state.

The sensor(s) 102 can be configured to capture the sensor data 104 indicating or otherwise being associated with at least a portion of the environment of the autonomous vehicle. The sensor data 104 can include image data (e.g., 2D camera data, video data, etc.), RADAR data, LIDAR data (e.g., 3D point cloud data, etc.), audio data, or other types of data. In some implementations, the sub-control system(s) 101 can obtain input from additional types of sensors, such as inertial measurement units (IMUs), altimeters, inclinometers, odometry devices, location or positioning devices (e.g., GPS, compass), wheel encoders, or other types of sensors. In some implementations, the sub-control system(s) 101 can obtain sensor data 104 associated with particular component(s) or system(s) of the autonomous vehicle. This sensor data 104 can indicate, for example, wheel speed, component temperatures, steering angle, cargo or passenger status, etc. In some implementations, the sub-control system(s) 101 can obtain sensor data 104 associated with ambient conditions, such as environmental or weather conditions. In some implementations, the sensor data 104 can include multi-modal sensor data. The multi-modal sensor data can be obtained by at least two different types of sensor(s) (e.g., of the sensors 102) and can indicate static and/or dynamic object(s) or actor(s) within an environment of the autonomous vehicle. The multi-modal sensor data can include at least two types of sensor data (e.g., camera and LIDAR data). In some implementations, the autonomous vehicle can utilize the sensor data 104 for sensors that are remote from (e.g., offboard) the autonomous vehicle. This can include for example, sensor data 104 captured by a different autonomous vehicle.

The sub-control system(s) 101 can obtain the map data 110 associated with an environment in which the autonomous vehicle was, is, or will be located. The map data 110 can provide information about an environment or a geographic area. For example, the map data 110 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous vehicle in understanding its surrounding environment and its relationship thereto. In some implementations, the map data 110 can include high-definition map information. Additionally or alternatively, the map data 110 can include sparse map data (e.g., lane graphs, etc.). In some implementations, the sensor data 104 can be fused with or used to update the map data 110 in real time.

The sub-control system(s) 101 can include the localization system 130, which can provide an autonomous vehicle with an understanding of its location and orientation in an environment. In some examples, the localization system 130 can support one or more other subsystems of the sub-control system(s) 101, such as by providing a unified local reference frame for performing, e.g., perception operations, planning operations, or control operations.

In some implementations, the localization system 130 can determine a current position of the autonomous vehicle. A current position can include a global position (e.g., respecting a georeferenced anchor, etc.) or relative position (e.g., respecting objects in the environment, etc.). The localization system 130 can generally include or interface with any device or circuitry for analyzing a position or change in position of an autonomous vehicle. For example, the localization system 130 can determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous vehicle can be used by various subsystems of the sub-control system(s) 101 or provided to a remote computing system (e.g., using the communication interface(s) 106).

In some implementations, the localization system 130 can register relative positions of elements of a surrounding environment of the autonomous vehicle with recorded positions in the map data 110. For instance, the localization system 130 can process the sensor data 104 (e.g., LIDAR data, RADAR data, camera data, etc.) for aligning or otherwise registering to a map of the surrounding environment (e.g., from the map data 110) to understand the autonomous vehicle's position within that environment. Accordingly, in some implementations, the autonomous vehicle can identify its position within the surrounding environment (e.g., across six axes, etc.) based on a search over the map data 110. In some implementations, given an initial location, the localization system 130 can update the autonomous vehicle's location with incremental re-alignment based on recorded or estimated deviations from the initial location. In some implementations, a position can be registered directly within the map data 110.

In some implementations, the map data 110 can include a large volume of data subdivided into geographic tiles, such that a desired region of a map stored in the map data 110 can be reconstructed from one or more tiles. For instance, a plurality of tiles selected from the map data 110 can be stitched together by the sub-control system 101 based on a position obtained by the localization system 130 (e.g., a number of tiles selected in the vicinity of the position).

In some implementations, the localization system 130 can determine positions (e.g., relative or absolute) of one or more attachments or accessories for an autonomous vehicle. For instance, an autonomous vehicle can be associated with a cargo platform, and the localization system 130 can provide positions of one or more points on the cargo platform. For example, a cargo platform can include a trailer or other device towed or otherwise attached to or manipulated by an autonomous vehicle, and the localization system 130 can provide for data describing the position (e.g., absolute, relative, etc.) of the autonomous vehicle as well as the cargo platform. Such information can be obtained by the other autonomy systems to help operate the autonomous vehicle.

The sub-control system(s) 101 can include the perception system 140, which can allow an autonomous platform to detect, classify, and track objects and actors in its environment. Environmental features or objects perceived within an environment can be those within the field of view of the sensor(s) 102 or predicted to be occluded from the sensor(s) 102. This can include object(s) not in motion or not predicted to move (static objects) or object(s) in motion or predicted to be in motion (dynamic objects/actors).

The perception system 140 can determine one or more states (e.g., current or past state(s), etc.) of one or more objects that are within a surrounding environment of an autonomous vehicle. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 140 can determine the state(s) using one or more algorithms or machine-learned models configured to identify/classify objects based on inputs from the sensor(s) 102. The perception system can use different modalities of the sensor data 104 to generate a representation of the environment to be processed by the one or more algorithms or machine-learned models. In some implementations, state(s) for one or more identified or unidentified objects can be maintained and updated over time as the autonomous vehicle continues to perceive or interact with the objects (e.g., maneuver with or around, yield to, etc.). In this manner, the perception system 140 can provide an understanding about a current state of an environment (e.g., including the objects therein, etc.) informed by a record of prior states of the environment (e.g., including movement histories for the objects therein). Such information can be helpful as the autonomous vehicle plans its motion through the environment.

The sub-control system(s) 100 can include the planning system 150, which can be configured to determine how the autonomous platform is to interact with and move within its environment. The planning system 150 can determine one or more motion plans for an autonomous platform. A motion plan can include one or more trajectories (e.g., motion trajectories) that indicate a path for an autonomous vehicle to follow. A trajectory can be of a certain length or time range. The length or time range can be defined by the computational planning horizon of the planning system 150. A motion trajectory can be defined by one or more waypoints (with associated coordinates). The waypoint(s) can be future location(s) for the autonomous platform. The motion plans can be continuously generated, updated, and considered by the planning system 150.

The planning system 150 can determine a strategy for the autonomous platform. A strategy may be a set of discrete decisions (e.g., yield to actor, reverse yield to actor, merge, lane change) that the autonomous platform makes. The strategy may be selected from a plurality of potential strategies. The selected strategy may be a lowest cost strategy as determined by one or more cost functions. The cost functions may, for example, evaluate the probability of a collision with another actor or object.

The planning system 150 can determine a desired trajectory for executing a strategy. For instance, the planning system 150 can obtain one or more trajectories for executing one or more strategies. The planning system 150 can evaluate trajectories or strategies (e.g., with scores, costs, rewards, constraints, etc.) and rank them. For instance, the planning system 150 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 150 can utilize static cost(s) to evaluate trajectories for the autonomous platform (e.g., "avoid lane boundaries," "minimize jerk," etc.). Additionally or alternatively, the planning system 150 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 150 can rank trajectories based on one or more static costs, one or more dynamic costs, or a combination thereof. The planning system 150 can select a motion plan (and a corresponding trajectory) based on a ranking of a plurality of candidate trajectories. In some implementations, the planning system 150 can select a highest ranked candidate, or a highest ranked feasible candidate.

The planning system 150 can then validate the selected trajectory against one or more constraints before the trajectory is executed by the autonomous platform.

To help with its motion planning decisions, the planning system 150 can be configured to perform a forecasting function. The planning system 150 can forecast future state(s) of the environment. This can include forecasting the future state(s) of other actors in the environment. In some implementations, the planning system 150 can forecast future state(s) based on current or past state(s) (e.g., as developed or maintained by the perception system 140). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous vehicle. Additionally or alternatively, the probabilities can include probabilities conditioned on trajectory options available to one or more other actors.

To implement selected motion plan(s), the sub-control system(s) 101 can include a control system 160 (e.g., a vehicle control system). Generally, the control system 160 can provide an interface between the sub-control system(s) 101 and the platform control devices 112 for implementing the strategies and motion plan(s) generated by the planning system 150. For instance, the control system 160 can implement the selected motion plan/trajectory to control the autonomous platform's motion through its environment by following the selected trajectory (e.g., the waypoints included therein). The control system 160 can, for example, translate a motion plan into instructions for the appropriate platform control devices 112 (e.g., acceleration control, brake control, steering control, etc.). By way of example, the control system 160 can translate a selected motion plan into instructions to adjust a steering component (e.g., a steering angle) by a certain number of degrees, apply a certain magnitude of braking force, increase/decrease speed, etc. In some implementations, the control system 160 can communicate with the platform control devices 112 through communication channels including, for example, one or more data buses (e.g., controller area network (CAN), etc.), onboard diagnostics connectors (e.g., OBD-II, etc.), or a combination of wired or wireless communication links. The platform control devices 112 can send or obtain data, messages, signals, etc. to or from the sub-control system(s) 101 (or vice versa) through the communication channel(s).

The sub-control system(s) 101 can receive, through communication interface(s) 106, assistive signal(s) from remote assistance system 170. Remote assistance system 170 can communicate with the sub-control system(s) 101 over a network. In some implementations, the sub-control system(s) 101 can initiate a communication session with the remote assistance system 170. For example, the sub-control system(s) 101 can initiate a session based on or in response to a trigger. In some implementations, the trigger may be an alert, an error signal, a map feature, a request, a location, a traffic condition, a road condition, etc.

After initiating the session, the sub-control system(s) 101 can provide context data to the remote assistance system 170. The context data may include sensor data 104 and state data of the autonomous vehicle. For example, the context data may include a live camera feed from a camera of the autonomous vehicle and the autonomous vehicle's current speed. An operator (e.g., human operator) of the remote assistance system 170 can use the context data to select assistive signals. The assistive signal(s) can provide values or adjustments for various operational parameters or characteristics for the sub-control system(s) 101. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the sub-control system(s) 101.

The sub-control system(s) 101 can use the assistive signal(s) for input into one or more autonomy subsystems for performing autonomy functions. For instance, the planning system 150 can receive the assistive signal(s) as an input for generating a motion plan. For example, assistive signal(s) can include constraints for generating a motion plan. Additionally or alternatively, assistive signal(s) can include cost or reward adjustments for influencing motion planning by the planning system 150. Additionally or alternatively, assistive signal(s) can be considered by the sub-control system(s) 101 as suggestive inputs for consideration in addition to other received data (e.g., sensor inputs, etc.).

The sub-control system(s) 101 may be platform agnostic, and the control system 160 can provide control instructions to platform control devices 112 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Referring now to FIGS. 2-5, a LIDAR system 200 is provided according to example implementations of the present disclosure. The LIDAR system 200 includes a LIDAR module 210. The LIDAR module 210 includes a substrate 212 defining a first axis 300 (e.g., longitudinal), a second axis 302 (e.g., vertical), and a third axis 304 (e.g., lateral). It will be understood that the first axis 300, second axis 302, and third axis 304 can be mutually orthogonal to one another.

In some implementations, the substrate 212 can be a ceramic substrate. For instance, in some implementations, the ceramic substrate can be formed from aluminum nitride (AlN). It will be understood that the scope of the present disclosure is intended to cover ceramic substrates formed from any suitable ceramic material. For instance, in some implementations, the ceramic substrate can be formed from aluminum oxide ($Al_2O_3$).

In some implementations, the substrate 212 can be an organic substrate formed from organic material. For instance, the organic material can include organic molecules or polymers. It will be appreciated that organic substrates can have better manufacturing tolerances compared to ceramic substrates.

The LIDAR module 210 can include an emitter 214 coupled to the substrate 212. The emitter 214 can include a light source (not shown) configured to emit a light beam 310 along the first axis 300 (FIG. 3) of the substrate 212. In some implementations, the light source can include a laser source (e.g., seed laser) and the light beam 310 can include a laser beam. For instance, in some implementations, the laser source can include one or more distributed-feedback lasers (DFBs).

The LIDAR module 210 can include an optic device 216 coupled to the substrate 212. The optic device 216 can be configured to receive the light beam 310 from the emitter 214. The optic device 216 can be configured to split the light beam 310 into a plurality of light beams 312. For instance, in some implementations, the optic device 216 can include a splitter configured to split the light beam 310 into the plurality of light beams 312. It will be understood that the optic device 216 can be configured to split the light beam 310 into any suitable number of light beams 312. For instance, in some implementations, the optic device 216 can be configured to split the light beam 310 into 8 separate light beams. In alternative implementations, the optic device 216 can be configured to split the light beam 310 into more (e.g., 16, 32, 64, etc.) or fewer (e.g., 4) light beams. It will be understood that the optical power of each of the plurality of light beams 312 output by the splitter is less than an optical power of the light beam 310 received from the emitter 214.

It will also be understood that the optic device 216 can include any suitable optic device configured to receive the light beam 310 and split the light beam 310 into the plurality of light beams 312. For instance, in some implementations, the optic device 216 can include an electro-optic device configured to split the light beam 310 into the plurality of light beams 312. In alternative implementations, the optic device 216 can include one or more optics configured to split the light beam 310 into the plurality of light beams 312.

The LIDAR module 210 can include an optical amplifier array 218 coupled to the substrate 212. The optical amplifier array 218 can be configured to receive the plurality of light beams 312 from the optic device 216. The optical amplifier array 218 can be further configured to amplify the plurality of light beams 312 to generate a plurality of amplified light beams 314. In this manner, the optical power of the amplified light beams 314 can be greater than the optical power of the plurality of light beams 312. For instance, in some implementations, the optical power of the amplified light beams 314 can range from 10 decibels greater than the optical power of the plurality of light beams 312 to 30 decibels greater than the optical power of the plurality of light beams 312.

It will be understood that, in some implementations, the optical amplifier array 218 can include a semiconductor optical amplifier array. The semiconductor optical amplifier array can be coupled to the substrate 212 and can be configured to amplify the plurality of light beams 312 to generate the plurality of amplified light beams 314.

The LIDAR module 210 can include a transceiver 220 coupled to the substrate 212. The transceiver 220 can be configured to receive the plurality of amplified light beams 314 from the optical amplifier array 218. The transceiver 220 can be further configured to redirect the plurality of amplified light beams 314. In some implementations, the transceiver 220 can be configured to redirect the plurality of amplified light beams 314 from traveling along the first axis 300 (FIG. 3) of the substrate 212 to traveling along the second axis 302 of the substrate 212. For instance, the transceiver 220 can include an edge grating coupler 222 configured to redirect the plurality of amplified light beams 314 traveling along the first axis 300 of the substrate 212 to traveling along the second axis 302 of the substrate 212.

It will be understood that the edge grating coupler 222 can include any suitable grating coupler configured to redirect the plurality of amplified light beams 314 from traveling along the first axis 300 to traveling along the second axis 302. For instance, in some implementations, the edge grating coupler 222 can include a surface grating coupler configured to redirect the plurality of amplified light beams 314 from traveling along the first axis 300 to traveling along the second axis 302.

It will be understood that the transceiver 220 can include any suitable transceiver configured to redirect the plurality of amplified light beams 314 from traveling along the first axis 300 to traveling along the second axis 302. For instance, in some implementations, the transceiver 220 can be a silicon photonics transceiver.

In some implementations, the LIDAR system 200 can include one or more optics 230 that are separate from the LIDAR module 210. The optic(s) 230 can be configured to receive the plurality of amplified light beams 314 from the transceiver 220. More specifically, the optic(s) 230 can be configured to receive the plurality of amplified light beams 314 traveling along the second axis 302 of the substrate 212. Furthermore, in some implementations, the optic(s) 230 can be configured to collimate the plurality of amplified light beams 314 along one or more axes to generate a plurality of collimated light beams 316.

In some implementations, the LIDAR system 200 can include a LIDAR scanner 240 configured to receive the plurality of collimated light beams 316 from the optic(s) 230. The LIDAR scanner 240 can be configured to transmit the plurality of collimated light beams 316 into a surrounding environment. It will be understood that the plurality of collimated light beams 316 reflect off one or more objects 318 in the surrounding environment and return to the LIDAR scanner 240 as a plurality of return light beams 320.

The LIDAR scanner 240 can be configured to provide the plurality of return light beams 320 to the LIDAR module 210. In some implementations, the return light beams 320 can be provided to the LIDAR module 210 through the optic(s) 230. For instance, the optic(s) 230 can receive the plurality of return light beams 320 from the LIDAR scanner 240. Furthermore, the optic(s) 230 can be configured to collimate the return light beams 320 along one or more axes to generate a plurality of collimated return light beams 322. In alternative implementations, the return light beams 320 received by the LIDAR scanner 240 can bypass the optic(s) 230 and instead be provided directly to the LIDAR module 210.

The transceiver 220 can be configured to redirect the plurality of collimated return light beams 322 from traveling along the second axis 302 (FIG. 3) of the substrate 212 to traveling along the first axis 300 (FIG. 3) of the substrate 212. In some implementations, the transceiver 220 can include a detector 224 configured to convert the plurality of collimated return light beams 322 to a plurality of electrical signals 324.

In some implementations, the LIDAR module 210 can include an amplifier 250 (e.g., a transimpedance amplifier) configured to receive the plurality of electrical signals 324 output by the detector 224 of the transceiver 220. The amplifier 250 can be configured to amplify the plurality of electrical signals 324 to generate a plurality of amplified electrical signals 326. In some implementations, the amplifier 250 can be coupled to a surface of the transceiver 220. For instance, in some implementations, the amplifier 250 can be bonded (e.g., flip-chip bonded) to the surface of the transceiver 220.

In some implementations, the LIDAR module 210 can include a processing circuit 260 coupled to the substrate 212. The processing circuit 260 can be configured to receive the plurality of amplified electrical signals 326. The processing circuit 260 can be further configured to process the plurality of amplified electrical signals 326 to generate point cloud data indicative of the surrounding environment. Furthermore, the processing circuit 260 can be configured to determine one or more features (e.g., size, shape, etc.) of the object(s) 318 in the surrounding environment based, at least in part, on the point cloud data.

In some implementations, the processing circuit 260 can include a field programmable gate array (FPGA). In alternative implementations, the processing circuit 260 can include a digital signal processor (DSP). It will be appreciated, however, that the processing circuit 260 can include any suitable electronic components (e.g., analog-to-digital converter) needed to perform processing of the plurality of amplified electrical signals 326.

Figure 6:
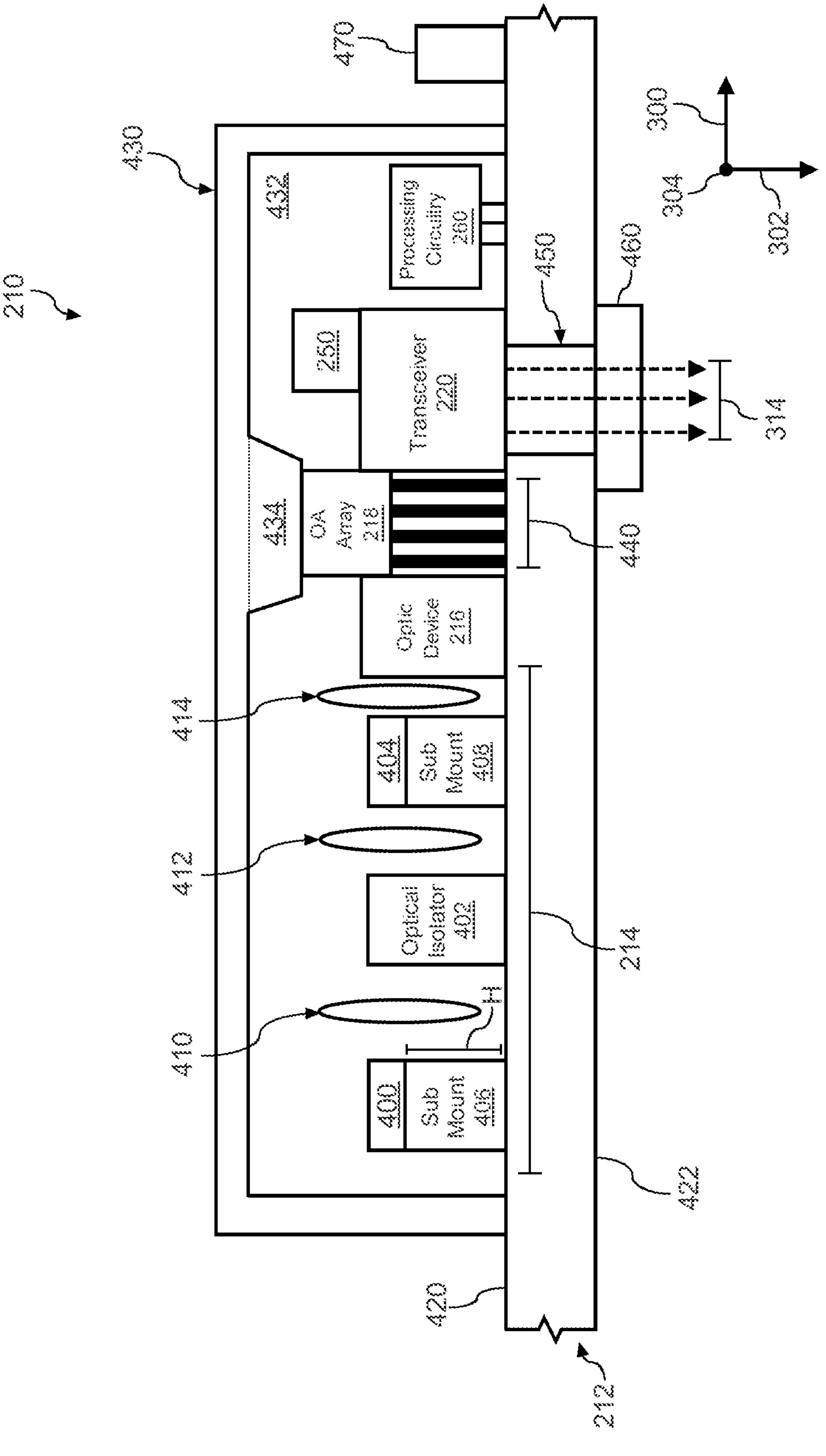
FIG. 6 depicts a side view of a LIDAR module of a LIDAR system according to some implementations of the present disclosure.
Figure 7:
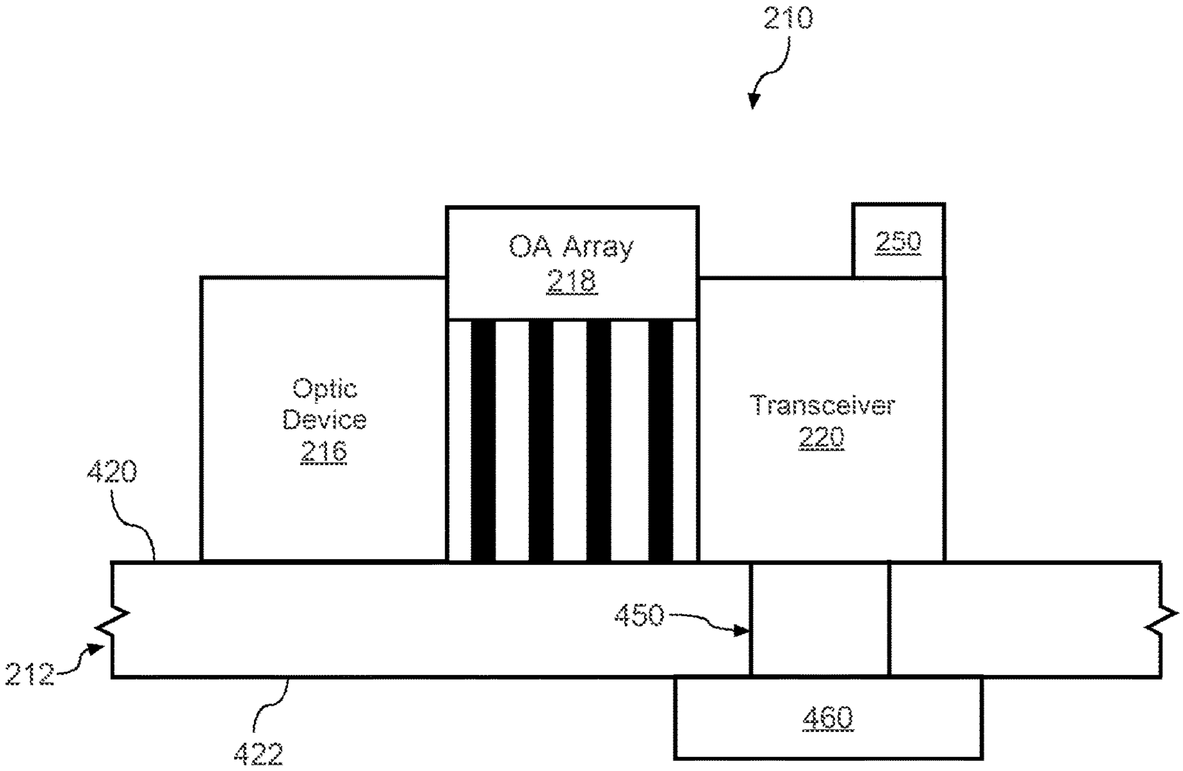
FIG. 7 depicts a portion of the side view of the LIDAR module depicted in FIG. 6 to illustrate edge-coupling between the optic device and the optical amplifier array and between the transceiver and the optical amplifier array according to some implementations of the present disclosure.

Referring now to FIGS. 6 and 7, a side view of the LIDAR module 210 is provided according to some implementations of the present disclosure. As shown, the emitter 214 can include one or more light sources 400. In some implementations, the emitter 214 can include an optical isolator 402. The optical isolator 402 can be configured to protect the light source(s) 400 from unwanted feedback light. Alternatively, or additionally, the emitter 214 can include a pre-amplifier 404. The pre-amplifier 404 can be configured to amplify the light beam emitted from the light source(s) 400. In this manner, the optical power of the light beam can be increased prior to being provided to the optic device 216.

In some implementations, the light source(s) 400 and the pre-amplifier 404 can be positioned on separate sub-mounts 406, 408. It will be appreciated that the height of the sub-mounts 406, 408 can be sufficient to align the light source(s) 400 and the pre-amplifier 404 with the optic device 216, the optical amplifier array 218, and the transceiver 220 along the second axis 302 (e.g., vertical direction) of the substrate 212. For instance, in some implementations, a height H of the sub-mounts 406, 408 can be in a range of about 100 microns to about 1000 microns. As used herein, use of the term "about" in conjunction with a numerical value refers to a range of values within 10 percent of the stated numerical value.

In some implementations, the sub-mount 406 on which the light source(s) 400 are positioned can be configured to provide electrical connections for the light source(s) 400. Alternatively, or additionally, the sub-mount 408 on which the pre-amplifier 404 is positioned can be configured to provide electrical connections for the pre-amplifier 404.

In some implementations, the emitter 214 can include a first optic 410, a second optic 412, and a third optic 414. The first optic 410 can be positioned between the light source(s) 400 and the optical isolator 402 along the first axis 300 of the substrate 212. The second optic 412 can be positioned between the optical isolator 402 and the pre-amplifier 404 along the first axis 300 of the substrate 212. The third optic 414 can be positioned between the pre-amplifier 404 and the optic device 216 along the first axis 300 of the substrate 212. It will be appreciated that the first optic 410, the second optic 412, and the third optic 414 can help with collimating and/or focusing the light beam emitted from the light source(s) 400. In some implementations, the first optic 410 can include a collimating lens, the second optic 412 can include a focusing lens, and the third optic 414 can include a lens array that includes one or more collimating lenses and one or more focusing lenses.

As shown, the emitter 214, optic device 216, optical amplifier array 218, transceiver 220, and processing circuit 260 can be respectively coupled to a first surface 420 of the substrate 212. Furthermore, in some implementations, the LIDAR module 210 can include a heat spreader 430 coupled to the first surface 420 of the substrate 212. As shown, in some implementations, the heat spreader 430 can enclose the emitter 214, optic device 216, optical amplifier array 218, transceiver 220, and processing circuit 260 within a cavity 432 defined by the heat spreader 430. In alternative implementations, one or more of the emitter 214, optic device 216, optical amplifier array 218, transceiver 220, and processing circuit 260 can be positioned outside of the cavity 432 defined by the heat spreader 430.

The heat spreader 430 can be configured to facilitate heat transfer from the optical amplifier array 218 to the heat spreader 430. In this manner, heat generated by the optical amplifier array 218 during amplification of the plurality of light beams 312 (FIG. 4) received from the optic device 216 can be dissipated by the heat spreader 430. In some implementations, the heat spreader 430 can include a projection 434 that spans a length of the optical amplifier array 218. In this manner, heat transfer from the optical amplifier array 218 to the heat spreader 430 can be improved.

In some implementations, the LIDAR module 210 can include a sub-mount 440 configured to support the optical amplifier array 218. In some implementations, the sub-mount 440 can include a plurality of vias (denoted by black lines) configured to electrically couple the optical amplifier array 218 to the substrate 212. For instance, in some implementations, the number of vias included in the sub-mount 440 can correspond to the number of channels of the optical amplifier array 218. It will be understood that each of the plurality of light beams 312 (FIG. 4) the optical amplifier array 218 receives from the optic device 216 represents a different channel of the optical amplifier array 218.

In some implementations, the sub-mount 440 can facilitate heat transfer from the optical amplifier array 218 to the substrate 212. In this manner, heat generated by the optical amplifier array 218 during amplification of the plurality of light beams 312 (FIG. 4) received from the optic device 216 can be dissipated by the sub-mount 440.

Figure 2:
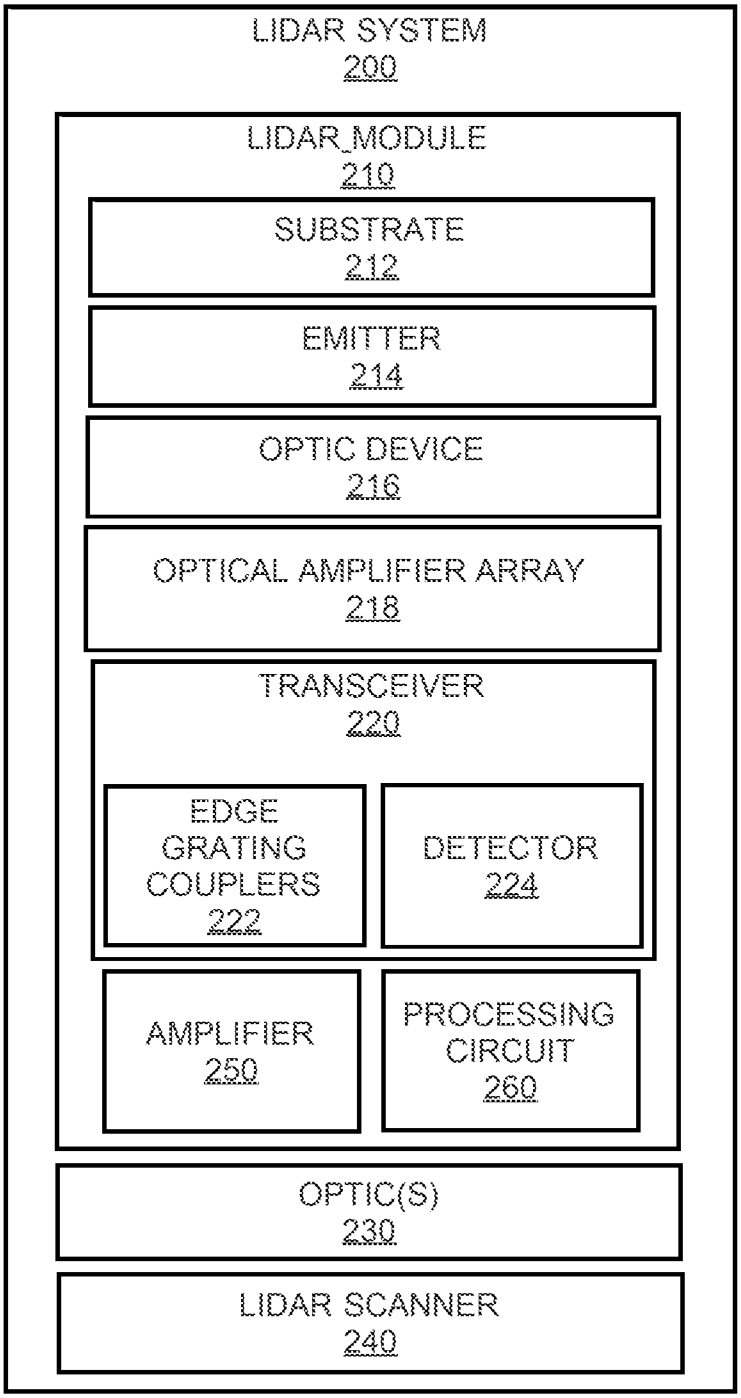
FIG. 2 depicts a block diagram of an example LIDAR system according to some implementations of the present disclosure.
Figure 3:
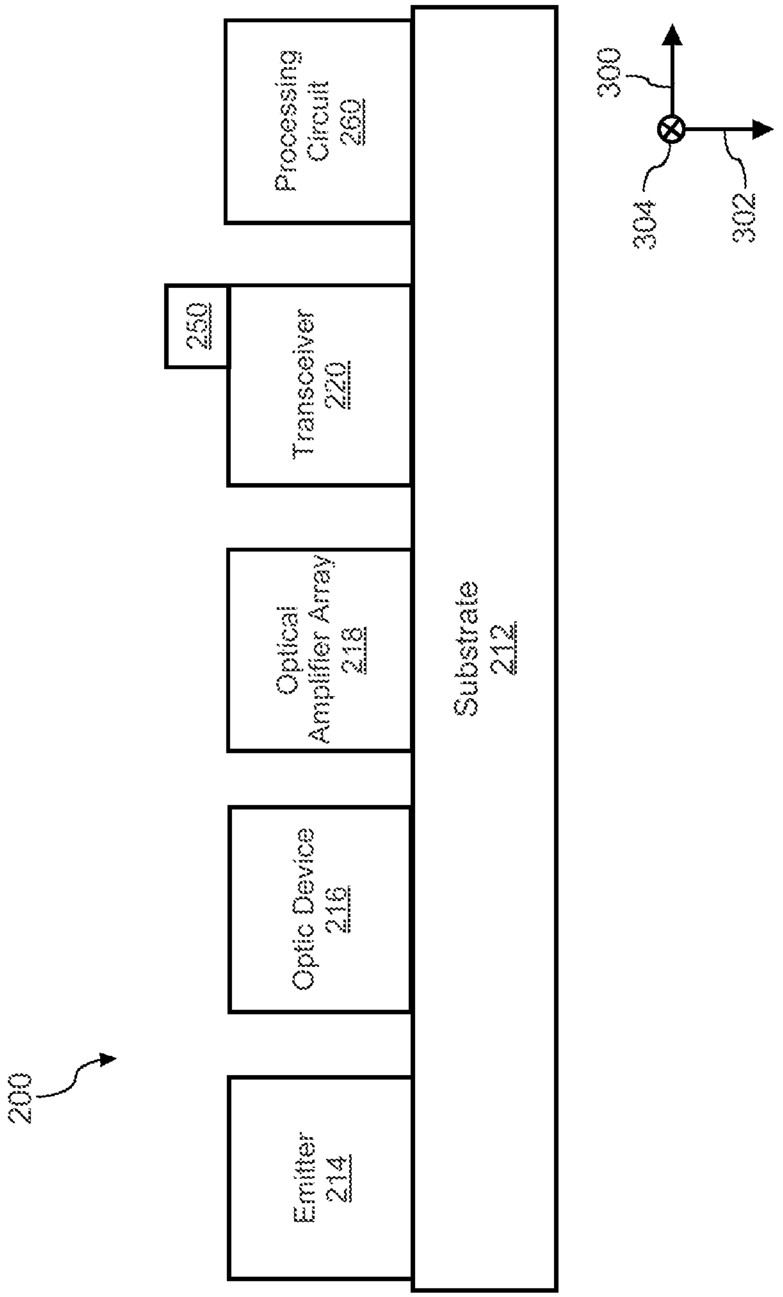
FIG. 3 depicts a LIDAR module of an example LIDAR system according to some implementations of the present disclosure.
Figure 4:
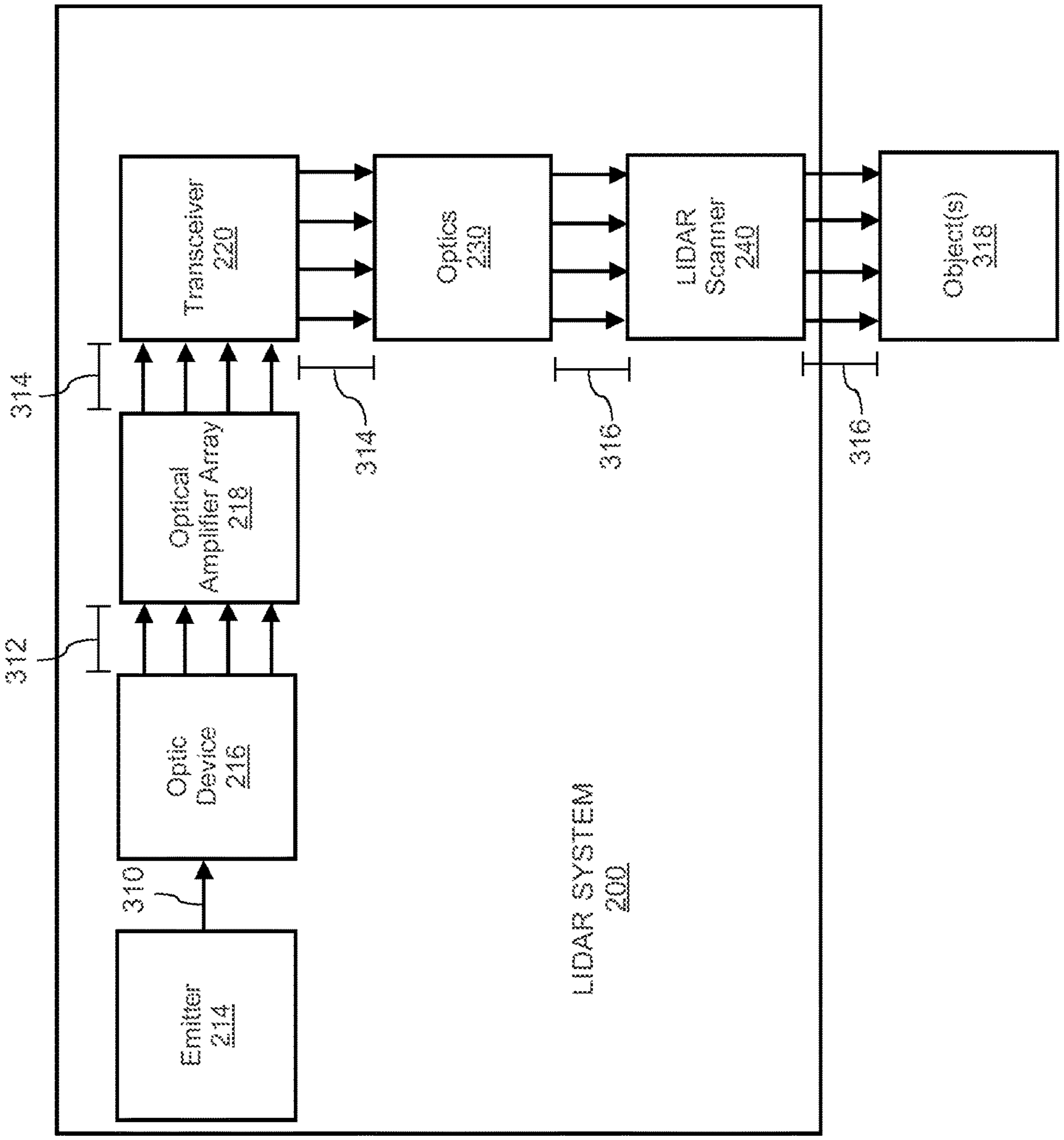
FIG. 4 depicts an example LIDAR system transmitting light beams into a surrounding environment according to some implementations of the present disclosure.
Figure 5:
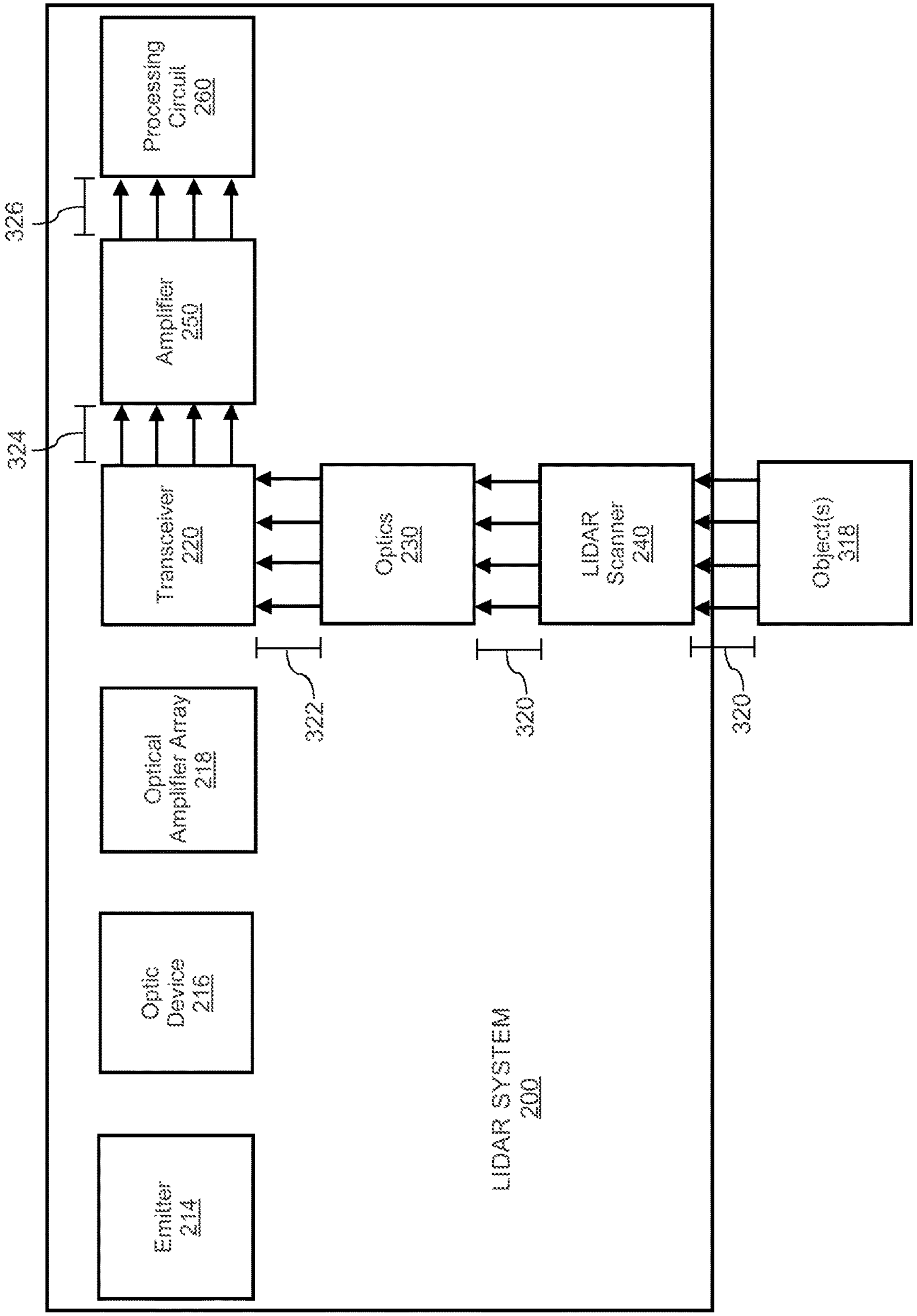
FIG. 5 depicts an example LIDAR system receiving return light beams from a surrounding environment according to some implementations of the present disclosure.

In some implementations, the LIDAR module 210 can be cooled by other components of the LIDAR system 200 (FIG. 2). For instance, in some implementations, a liquid cooled cold plate (not shown) can be coupled to the heat spreader 430. In this manner, heat transferred from the optical amplifier array 218 to the heat spreader 430 can be further transferred to the liquid cooled cold plate. Alternatively, or additionally, a liquid cooled cold plate can be coupled to the second surface 422 of the substrate 212. In this manner, heat transferred from the optical amplifier array 218 through the sub-mount 440 and to the substrate 212 can be further transferred to the liquid cooled cold plate to prevent the substrate 212 from overheating and affecting the performance of other components (e.g., processing circuit 260) of the LIDAR module 210 that are coupled to the substrate 212.

It will be appreciated that any suitable device can be used to provide additional cooling of the LIDAR module 210. For instance, in some implementations, a fan (not shown) can be configured to direct air across one or more surfaces of the heat spreader 430. Alternatively, or additionally, a fan can be configured to direct air across one or more surfaces of the substrate 212.

As shown in FIGS. 6 and 7, the substrate 212 can, in some implementations, define an aperture 450 extending therethrough. For instance, a particular portion of the substrate 212 can define the aperture 450 that extends from the first surface 420 of the substrate 212 to a second surface 422 of the substrate 212. In such implementations, the transceiver 220 can be configured to redirect the plurality of amplified light beams 314 traveling along the first axis 300 of the substrate 212 to travel along the second axis 302 of the substrate 212 to direct the plurality of amplified light beams 314 (FIG. 4) through the aperture 450 defined by the substrate 212. It will be appreciated that the collimated return light beams 322 (FIG. 5) can travel through the aperture 450 and be redirected by the transceiver 220. For instance, the transceiver 220 can be configured to redirect the plurality of collimated return light beams 322 from traveling along the second axis 302 of the substrate 212 to travel along the first axis 300 of the substrate 212. In this manner, the plurality of collimated return light beams 322 can be converted to the plurality of electrical signals 324 by the detector 224 of the transceiver 220 and provided to the amplifier 250 to generate the plurality of amplified electrical signals 326 (FIG. 5) that are then processed by the processing circuit 260.

In some implementations, the LIDAR module 210 can include an optical window 460 coupled to the second surface 422 of the substrate 212. For instance, in some implementations, the optical window 460 can be brazed to the second surface 422 of the substrate 212. Furthermore, the optical window 460 can, like the transceiver 220, be aligned with the aperture 450. In this manner, the plurality of amplified light beams 314 can pass through the optical window 460 to exit the aperture 450. Likewise, the plurality of collimated return light beams 322 can pass through the optical window 460 to enter the aperture 450. In some implementations, the optical window 460 can include a sapphire window.

In alternative implementations, the transceiver 220 can be sealed to the first surface 420 of the substrate 212 to cover the aperture 450. More specifically, in some implementations, the transceiver 220 can be sealed against the first surface 420 of the substrate 212 with a metallic solder or brazing material to create a hermetic seal. In alternative implementations, the transceiver 220 can be sealed against the first surface 420 of the substrate 212 with an epoxy material to create a near-hermetic seal. It will be appreciated that sealing the transceiver 220 against the first surface 420 of the substrate 212 can eliminate the need for the optical window 460. In this manner, the seal between the transceiver 220 and the first surface 420 of the substrate 212 reduces the complexity of the LIDAR module 210 since the optical window 460 is no longer needed.

In some implementations, the LIDAR module 210 can include an electrical connector 470 configured to electrically couple components (e.g., emitter 214, optic device 216, optical amplifier array 218, transceiver 220, amplifier 250, processing circuit 260) of the LIDAR module 210 to other electronic components (e.g., motherboard) that are separate from the LIDAR module 210. For instance, in some implementations, the electrical connector 470 can be disposed on the first surface 420 of the substrate 212 and can be positioned outside of the cavity 432 defined by the heat spreader 430 as shown. In alternative implementations, the electrical connector 470 can be disposed on the second surface 422 of the substrate 212.

In some implementations, the optic device 216 can, as shown for example in FIG. 7, be coupled to the optical amplifier array 218. In particular, the optic device 216 can be edge-coupled (i.e., butt-coupled). Edge-coupling or butt-coupling may refer to aligning optical devices, such that the waveguide of one optical device (e.g., optic device) faces the waveguide of another optical device (e.g., optical amplifier array). In this manner, losses in the optical power of the light beams 312 (FIG. 4) being provided from the optic device 216 to the optical amplifier array 218 can be minimized or otherwise configured to be less than a threshold loss level. Furthermore, in some implementations, the optic device 216 can be edge-coupled to the optical amplifier array 218 using an epoxy material to further improve optical coupling between the optic device 216 and the optical amplifier array 218.

In some implementations, the optical amplifier array 218 can, as shown for example in FIG. 7, be edge-coupled to the transceiver 220. In this manner, losses in the optical power of the amplified light beams 314 (FIG. 4) being provided from the optical amplifier array 218 to the transceiver 220 can be minimized or otherwise configured to be less than a threshold loss level. Furthermore, in some implementations, the optical amplifier array 218 can be edge-coupled to the transceiver 220 using an epoxy material to further improve optical coupling between the optical amplifier array 218 and the transceiver 220.

Figure 8:
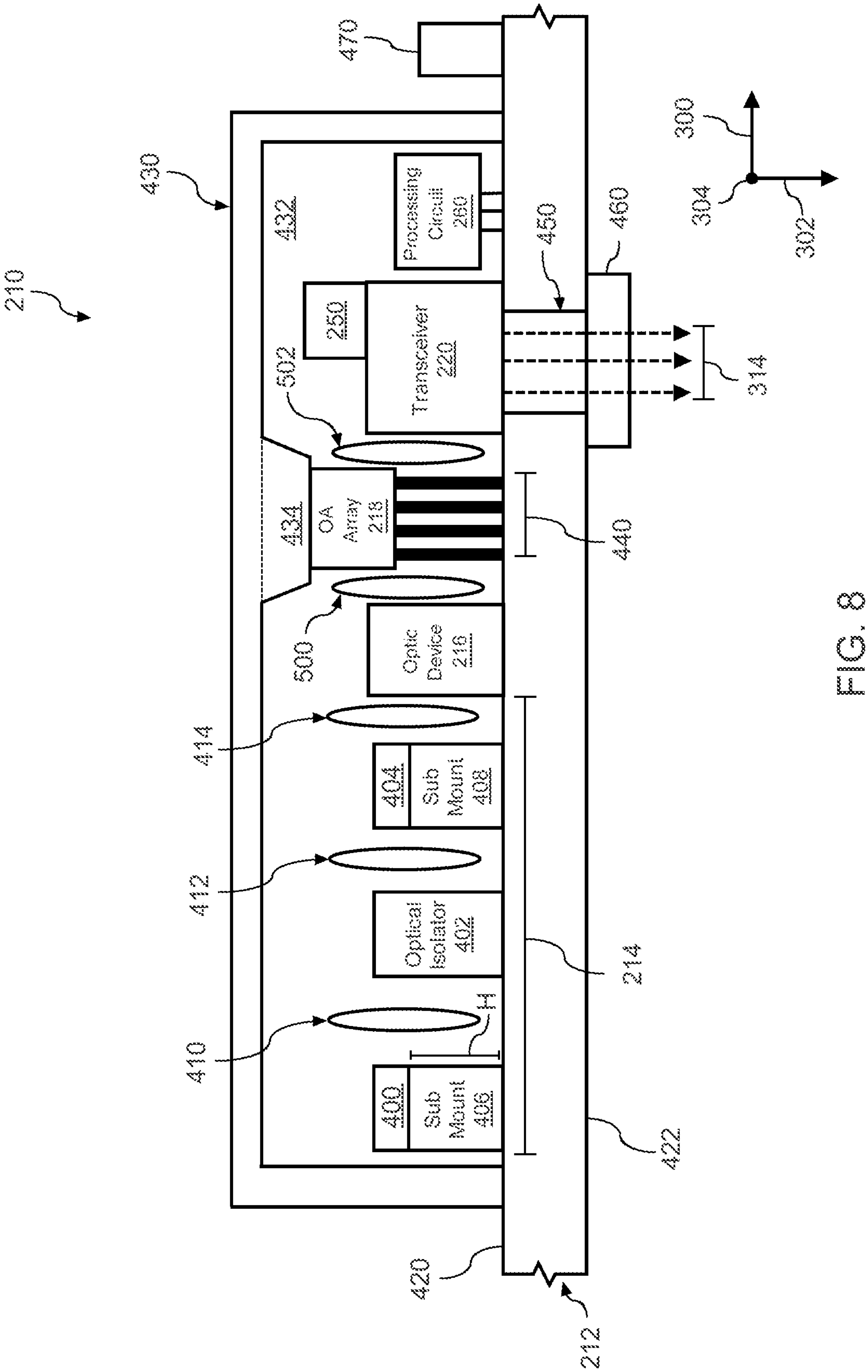
FIG. 8 depicts a side view of a LIDAR module of a LIDAR system according to some implementations of the present disclosure.

Referring now to FIG. 8, a side view of the LIDAR module 210 is provided according to some implementations of the present disclosure. It will be understood that the LIDAR module 210 depicted in FIG. 8 is substantially similar to the LIDAR module 210 just discussed with reference to FIGS. 6 and 7. For instance, the LIDAR module 210 depicted in FIG. 8 includes the optic device 216, the optical amplifier array 218, and the transceiver 220. However, in contrast to the LIDAR module 210 depicted in FIGS. 6 and 7, the optic device 216 is not edge-coupled to the optical amplifier array 218. Furthermore, the optical amplifier array 218 is not edge-coupled to the transceiver 220. Instead, as will be discussed below in more detail, the LIDAR module 210 includes dedicated optics to facilitate optical coupling between these components of the LIDAR module 210.

As shown, the LIDAR module 210 can include a first optic 500 positioned between the optic device 216 and the optical amplifier array 218 along the first axis 300 of the substrate 212. Furthermore, the LIDAR module 210 can include a second optic 502 positioned between the optical amplifier array 218 and the transceiver 220 along the first axis 300 of the substrate 212. It will be appreciated that the optic device 216 is optically coupled to the optical amplifier array 218 by the first optic 500. It will also be appreciated that the optical amplifier array 218 is optically coupled to the transceiver 220 by the second optic 502. In some implementations, the first optic 500 can include a first micro lens and the second optic 502 can include a second micro lens. It will be appreciated that, in some implementations, the first optic 500, the second optic 502, or both can include a lens array that includes one or more collimating lenses and one or more focusing lenses.

It will be appreciated that edge-coupling the optical amplifier array 218 to the optic device 216 and edge-coupling the transceiver 220 to the optical amplifier array 218 as discussed above with reference to FIG. 7 has some advantages over using dedicated optics (e.g., first optics 500, second optic 502) to facilitate optical coupling between these same components. For instance, the LIDAR module 210 in FIG. 7 requires fewer components and therefore has a smaller footprint. It will also be appreciated that edge-coupling the optical amplifier array 218 to the optic device 216 and edge-coupling the transceiver 220 to the optical amplifier array 218 has some disadvantages. For instance, the LIDAR module 210 in FIG. 7 is susceptible to bowing due, at least in part, to the edge-coupling. It will be appreciated that the LIDAR module in FIG. 8 is less susceptible to bowing since no components are edge-coupled to one another. However, as already mentioned, the LIDAR module 210 in FIG. 8 can be considered more complex than the LIDAR module 210 depicted in FIG. 7 in that the LIDAR module 210 in FIG. 8 includes additional components (e.g., first optic 500, second optic 502).

Figure 9:
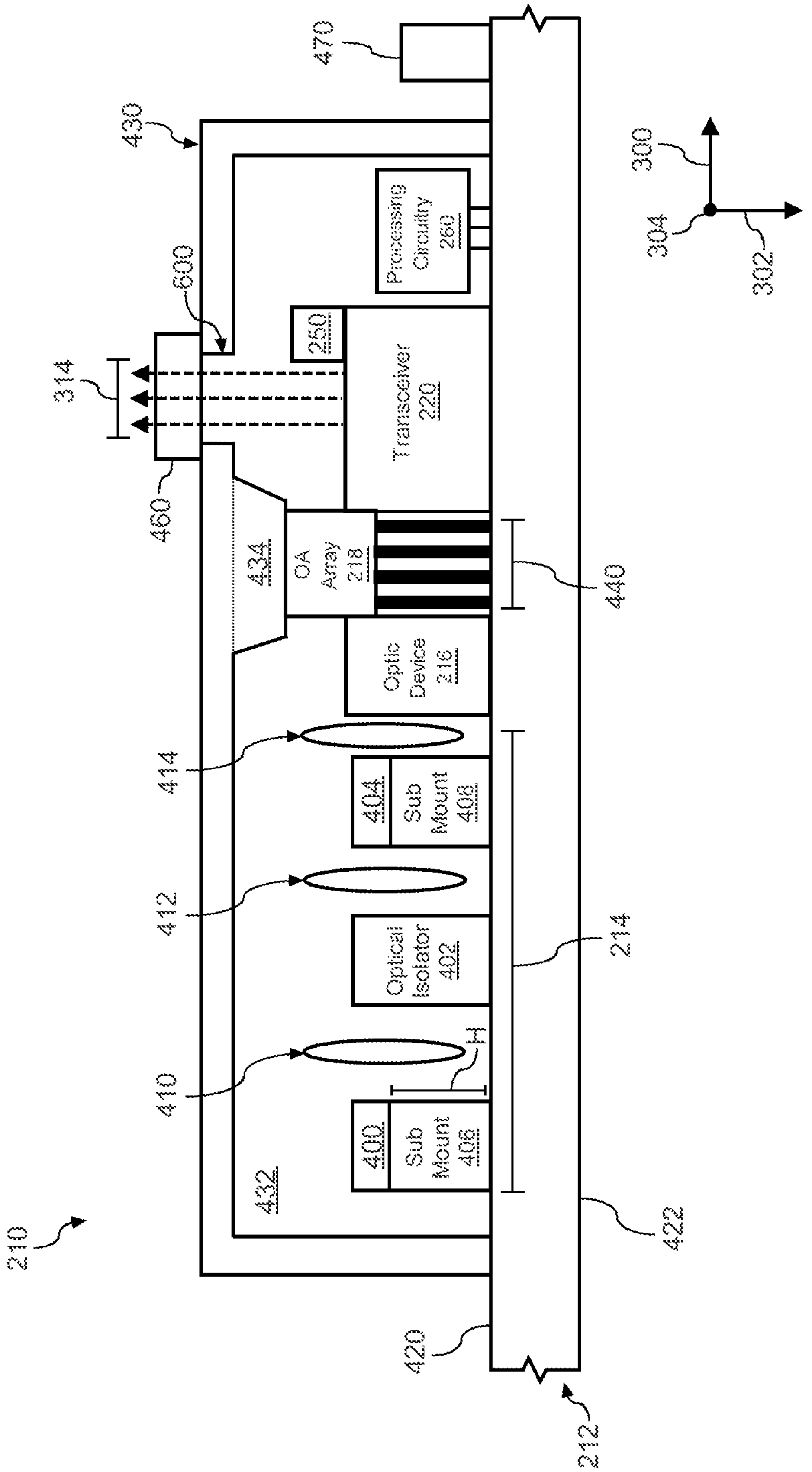
FIG. 9 depicts a side view of a LIDAR module of a LIDAR system according to some implementations of the present disclosure.

Referring now to FIG. 9, a side view of the LIDAR module 210 is provided according to some implementations of the present disclosure. It will be understood that the LIDAR module 210 depicted in FIG. 9 is substantially similar to the LIDAR module 210 depicted in FIG. 6. For instance, the LIDAR module 210 depicted in FIG. 9 includes the optic device 216, the optical amplifier array 218, and the transceiver 220. However, in contrast to the LIDAR module 210 depicted in FIG. 6, the substrate 212 of the LIDAR module in FIG. 9 does not have an aperture. Instead, the heat spreader 430 defines an aperture 600 and the transceiver 220 is configured to redirect the plurality of amplified light beams 314 from traveling along the first axis 300 of the substrate 212 to traveling along the second axis 302 of the substrate 212 to direct the plurality of amplified light beams 314 through the aperture 600 defined by a particular portion of the heat spreader 430. Additionally, the optical window 460 can be positioned on the heat spreader 430 as shown so that the optical window 460 is aligned with the aperture 600 defined by the heat spreader 430.

It will be appreciated that the LIDAR module 210 depicted in FIG. 8 and the LIDAR module 210 depicted in FIG. 9 are integrated with external electrical components to form the LIDAR system 200 (FIG. 2). In this manner, both the LIDAR module 210 depicted in FIG. 8 and the LIDAR module depicted in FIG. 9 include the electrical connector 470 to facilitate connecting components of the LIDAR module 210 to external electrical components. It will be appreciated that electrical connections for the LIDAR module 210 in FIG. 9 could be simplified compared to electrical connections for the LIDAR module 210 in FIG. 8 since the substrate 212 of the LIDAR module 210 in FIG. 9 does not include an aperture. However, it will be appreciated that the LIDAR module 210 in FIG. 9 may have more thermal constraints compared to the LIDAR module 210 in FIG. 8 since the heat spreader 430 of the LIDAR module 210 in FIG. 9 defines the aperture 600.

The following describes the technology of this disclosure within the context of an autonomous vehicle for example purposes only. As described herein, the technology described herein is not limited to an autonomous vehicle and can be implemented for or within other autonomous platforms and other computing systems.

What is claimed is:

1. A light detection and ranging (LIDAR) system for a vehicle, the LIDAR system comprising:

a substrate;

an emitter coupled to the substrate, the emitter configured to emit a light beam along a first axis of the substrate;

an optic device coupled to the substrate, the optic device configured to split the light beam into a plurality of light beams;

an optical amplifier array coupled to the substrate, the optical amplifier array configured to amplify the plurality of light beams received from the optic device to generate a plurality of amplified light beams; and a transceiver coupled to the substrate and edge-coupled to the optical amplifier array, the transceiver configured to redirect the plurality of amplified light beams from traveling along the first axis of the substrate to traveling along a second axis of the substrate that is different from the first axis.

2. The LIDAR system of claim 1, wherein the transceiver includes a grating coupler configured to redirect the plurality of amplified light beams from traveling along the first axis of the substrate to traveling along the second axis of the substrate.

3. The LIDAR system of claim 1, wherein:

the substrate includes a particular portion that defines an aperture; and the transceiver is configured to redirect the plurality of amplified light beams from traveling along the first axis of the substrate to traveling along the second axis of the substrate to direct the plurality of amplified light beams through the aperture defined by the particular portion of the substrate.

4. The LIDAR system of claim 1, further comprising:

a heat spreader coupled to the substrate to enclose the emitter, the optic device, the optical amplifier array, and the transceiver within a cavity defined by the heat spreader.

5. The LIDAR system of claim 4, wherein the heat spreader is coupled to the optical amplifier array to facilitate heat transfer from the optical amplifier array to the heat spreader.

6. The LIDAR system of claim 4, wherein:

the heat spreader includes a particular portion that defines an aperture; and the transceiver is configured to redirect the plurality of amplified light beams from traveling along the first axis of the substrate to traveling along the second axis of the substrate to direct the plurality of amplified light beams through the aperture defined by the heat spreader.

7. The LIDAR system of claim 1, wherein:

the optical amplifier array is edge coupled to the optic device.

8. The LIDAR system of claim 1, wherein the emitter, the optic device, the optical amplifier array, and the transceiver are coupled to a first surface of the substrate.

9. The LIDAR system of claim 8, wherein:

the substrate defines an aperture extending therethrough; and the transceiver is aligned with the aperture.

10. The LIDAR system of claim 9, further comprising:

an optical window coupled to a second surface of the substrate, the optical window is aligned with the aperture.

11. The LIDAR system of claim 1, wherein the transceiver is coupled to the substrate with an epoxy material, a metallic solder, or a brazing material to create a seal between the substrate and the transceiver.

12. The LIDAR system of claim 1, wherein the emitter includes a distributed feedback laser and the light beam includes a laser beam.

13. The LIDAR system of claim 1, wherein an optical power of the respective amplified light beams output by the optical amplifier array is in a range of 10 decibels greater than an optical power of the respective light beams output by the optic device to 30 decibels greater than the optical power of the respective light beams output by the optic device.

14. The LIDAR system of claim 1, wherein the substrate includes a ceramic substrate.

15. The LIDAR system of claim 1, further comprising:

an optic configured to receive the plurality of amplified light beams traveling along the second axis of the substrate and collimate the plurality of amplified light beams to generate a plurality of collimated light beams.

16. The LIDAR system of claim 15, further comprising:

a LIDAR scanner configured to transmit the plurality of collimated light beams into a surrounding environment and receive a plurality of return light beams from the surrounding environment.

17. The LIDAR system of claim 1, further comprising:

a first optic positioned between the optic device and the optical amplifier array along the first axis of the substrate.

18. The LIDAR system of claim 17, wherein the first optic comprises a lens array that includes one or more collimating lenses and one or more focusing lenses.

19. An autonomous vehicle control system comprising:

a light detection and ranging (LIDAR) system comprising:

a substrate;

an emitter coupled to the substrate, the emitter configured to emit a light beam along a first axis of the substrate;

an optic device coupled to the substrate, the optic device configured to split the light beam into a plurality of light beams;

an optical amplifier array coupled to the substrate, the optical amplifier array configured to amplify the plurality of light beams received from the optic device to generate a plurality of amplified light beams; and a transceiver coupled to the substrate and edge-coupled to the optical amplifier array, the transceiver configured to redirect the plurality of amplified light beams from traveling along the first axis of the substrate to traveling along a second axis of the substrate that is different from the first axis.

20. An autonomous vehicle comprising:

a light detection and ranging (LIDAR) system comprising:

a substrate;

an emitter coupled to the substrate, the emitter configured to emit a light beam along a first axis of the substrate;

an optic device coupled to the substrate, the optic device configured to split the light beam into a plurality of light beams;

an optical amplifier array coupled to the substrate, the optical amplifier array configured to amplify the plurality of light beams received from the optic device to generate a plurality of amplified light beams; and a transceiver coupled to the substrate and edge-coupled to the optical amplifier array, the transceiver configured to redirect the plurality of amplified light beams from traveling along the first axis of the substrate to traveling along a second axis of the substrate that is different from the first axis.

* * * * *